US007070874B2

(12) United States Patent
Blanchet et al.

(10) Patent No.: US 7,070,874 B2
(45) Date of Patent: Jul. 4, 2006

(54) FUEL CELL END UNIT WITH INTEGRATED HEAT EXCHANGER

(75) Inventors: Scott Blanchet, Chelmsford, MA (US); Pinakin Patel, Danbury, CT (US)

(73) Assignee: FuelCell Energy, Inc., Danbury, CT (US)

( * ) Notice: Subject to any disclaimer, the term of this patent is extended or adjusted under 35 U.S.C. 154(b) by 56 days.

(21) Appl. No.: 10/329,182

(22) Filed: Dec. 24, 2002

(65) Prior Publication Data

US 2004/0121205 A1 Jun. 24, 2004

(51) Int. Cl.
*H01M 8/04* (2006.01)
*H01M 8/24* (2006.01)

(52) U.S. Cl. ............................ 429/26; 429/34; 429/38

(58) Field of Classification Search ................. 429/12, 429/26, 34, 38, 39; 165/176, 134.1, 145, 165/162

See application file for complete search history.

(56) References Cited

U.S. PATENT DOCUMENTS 1,967,781 A * 7/1934 Potter et al. .................. 165/72
3,101,930 A * 8/1963 Huet .......................... 165/143
4,225,654 A * 9/1980 Tajima et al. ................. 429/34
4,719,157 A * 1/1988 Tsutsumi et al. ............. 429/34
5,009,968 A 4/1991 Guthrie et al.
5,324,565 A * 6/1994 Leonida et al. ............. 428/131
5,856,034 A 1/1999 Huppman et al.
6,106,964 A * 8/2000 Voss et al. ..................... 429/20
6,110,612 A * 8/2000 Walsh ......................... 429/13
6,318,066 B1 * 11/2001 Skowronski ................. 60/776

FOREIGN PATENT DOCUMENTS

JP 60105177 A * 6/1985
JP 64-048381 A * 2/1989
JP 01089154 A * 4/1989
JP 04121969 A * 4/1992
JP 07006782 A * 1/1995
JP 09293528 A * 11/1997

* cited by examiner

*Primary Examiner*—Gregg Cantelmo
(74) *Attorney, Agent, or Firm*—Cowan, Liebowitz & Latman, P.C.

(57) ABSTRACT

An end unit for a fuel cell stack is described that contains an integrated heat exchanger for superheating the fuel gas before delivery to the stack. Heat is transferred from the hot cathode outlet stream to the cool fuel inlet stream in a space adjacent the stack's end plate. The end unit is designed as a hollow box forming the shell of the exchanger with the heat exchanger inside. The end unit has openings that allow fuel cell process gas to be taken directly from the stack without requiring piping or ductwork to be attached to thin manifolds. Separate chambers are provided for both the cathode outlet and anode outlet gas, thereby allowing all process connections to be made at one end of the stack. The end unit also features a current collection post that is separated from the end cell of the stack by a multitude of members which provide structural support for the end unit and act to more uniformly collect electrical current than would a single, large current post.

35 Claims, 6 Drawing Sheets

FUEL CELL END UNIT WITH INTEGRATED HEAT EXCHANGER

BACKGROUND OF THE INVENTION

This invention relates to fuel cells and, in particular, to end plates and heat exchangers for fuel cell systems. More specifically, this invention relates to highly integrated, compact heat exchangers for use in superheating fuel gas for high temperature fuel cells.

A fuel cell is a device which directly converts chemical energy stored in a fuel such as hydrogen or methane into electrical energy by means of an electrochemical reaction. This differs from traditional electric power generating methods which must first combust the fuel to produce heat and then convert the heat into mechanical energy and finally into electricity. The more direct conversion process employed by a fuel cell has significant advantages over traditional means in both increased efficiency and reduced pollutant emissions.

In general, a fuel cell, similar to a battery, includes a negative (anode) electrode and a positive (cathode) electrode separated by an electrolyte which serves to conduct electrically charged ions between them. In contrast to a battery, however, a fuel cell will continue to produce electric power as long as fuel and oxidant are supplied to the anode and cathode, respectively. To achieve this, gas flow fields are provided adjacent to the anode and cathode through which fuel and oxidant gas are supplied. In order to produce a useful power level, a number of individual fuel cells must be stacked in series with an electrically conductive separator plate between each cell.

In a conventional fuel cell stack for stationary power applications, the active area of the fuel cells is large, typically between ½ and 1 $m^2$. In order to apply a reasonable interface pressure on the cells, a large compressive load must be applied to the cells through the end plates. As the end plates must remain flat to insure intimate contact is maintained with the cells, the end plates are typically thick relative to their length and width. This thickness adds to the overall length of the fuel cell stack and size of the fuel cell power plant.

In addition, for high temperature fuel cell systems, a heat exchanger is required to heat the fuel gas to near the temperature of the stack prior to delivery to the stack. In one type of fuel cell system, this heat exchanger is placed external to the fuel cell stack as part of the balance of the plant. This requires additional space to accommodate the fairly thick insulation (2–3 inches) used to encase the heat exchanger. Also, in this type of system, process gas must be piped to and from the heat exchanger, adding to both the size and cost of the system.

As described in U.S. Pat. No. 5,856,034, insulation for the heat exchanger can be eliminated by placing the heat exchanger inside the already insulated fuel cell module enclosing the fuel cell stack. Specifically, the heat exchanger is placed upstream and adjacent the cathode inlet face of the stack, making it necessary to construct the exchanger large enough so as to completely cover the cathode inlet face. Also, in this system, due to the inherent non-uniform temperature distribution at the outlet of the heat exchanger, the stack inlet temperature distribution is also non-uniform. This condition is undesirable as non-uniform cathode inlet temperature not only creates a potential performance variation in the stack but also creates the risk of cell-to-cell wet seal leaks due to thermal expansion differences of the stack face.

U.S. Pat. No. 5,009,968 describes an end plate structure in which a thin membrane is used to maintain good electrical contact with the end cells of the fuel cell stack. The thin membrane structure is not specifically adapted to uniformly collect electrical current from the stack. U.S. Pat. No. 4,719,157 describes a thin end plate with multiple current collecting terminals used to inhibit deformation of the plate. Again, this arrangement is not specifically adapted to provide uniform collection of electrical current.

SUMMARY OF THE INVENTION

The present invention provides an end unit of a fuel cell stack having an assembly adapted to receive and convey gases in a heat exchange relationship, and/or to restrict electrical current flow from the fuel cell stack to a current collection post.

BRIEF DESCRIPTION OF THE DRAWINGS

The above and other features and aspects of the present invention will become more apparent upon reading the following detailed description in conjunction with the accompanying drawings in which.

DETAILED DESCRIPTION

Figure 1:
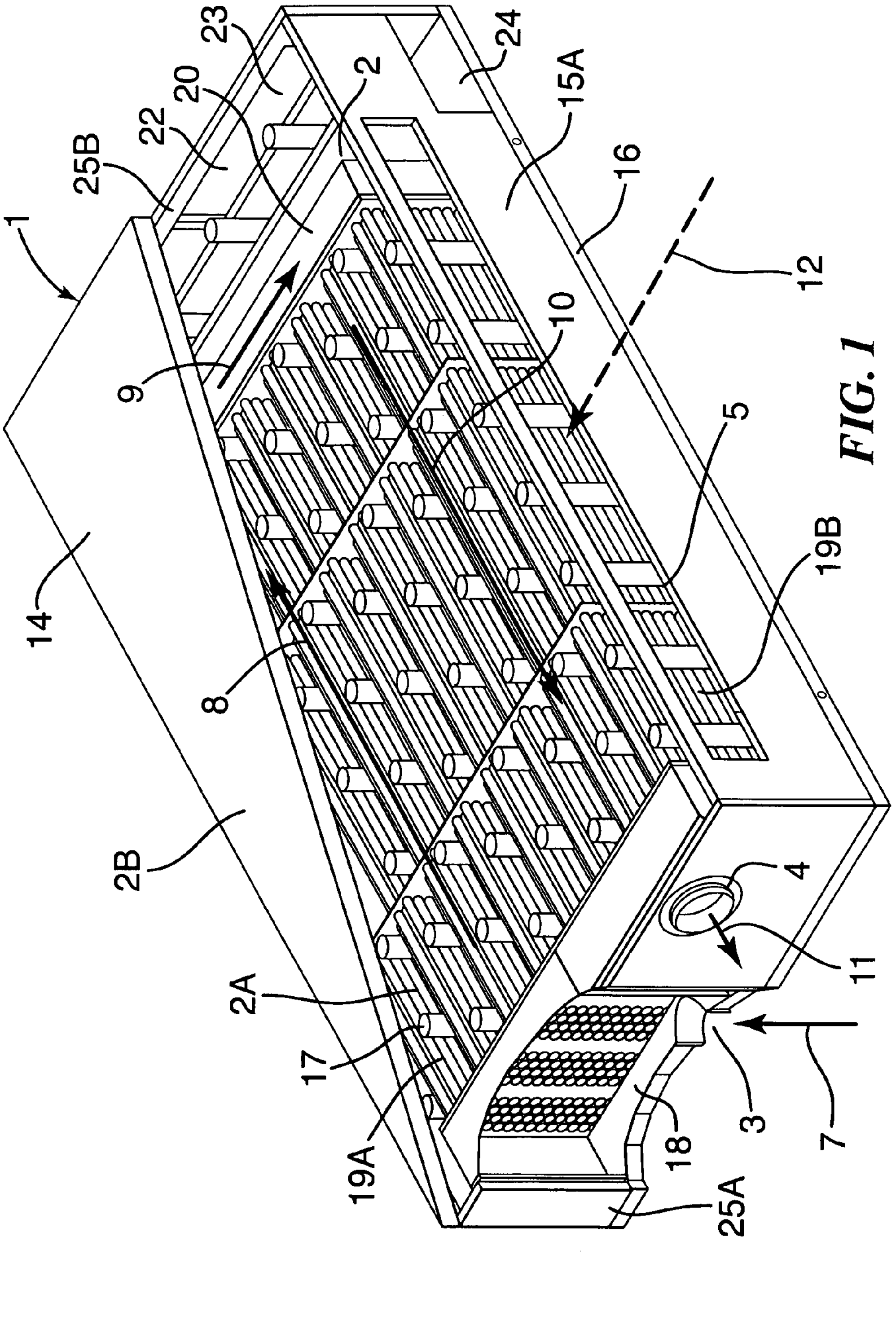
FIGS. 1 and 2 are isometric views of the end unit in accordance with the principles of the present invention.
Figure 2:
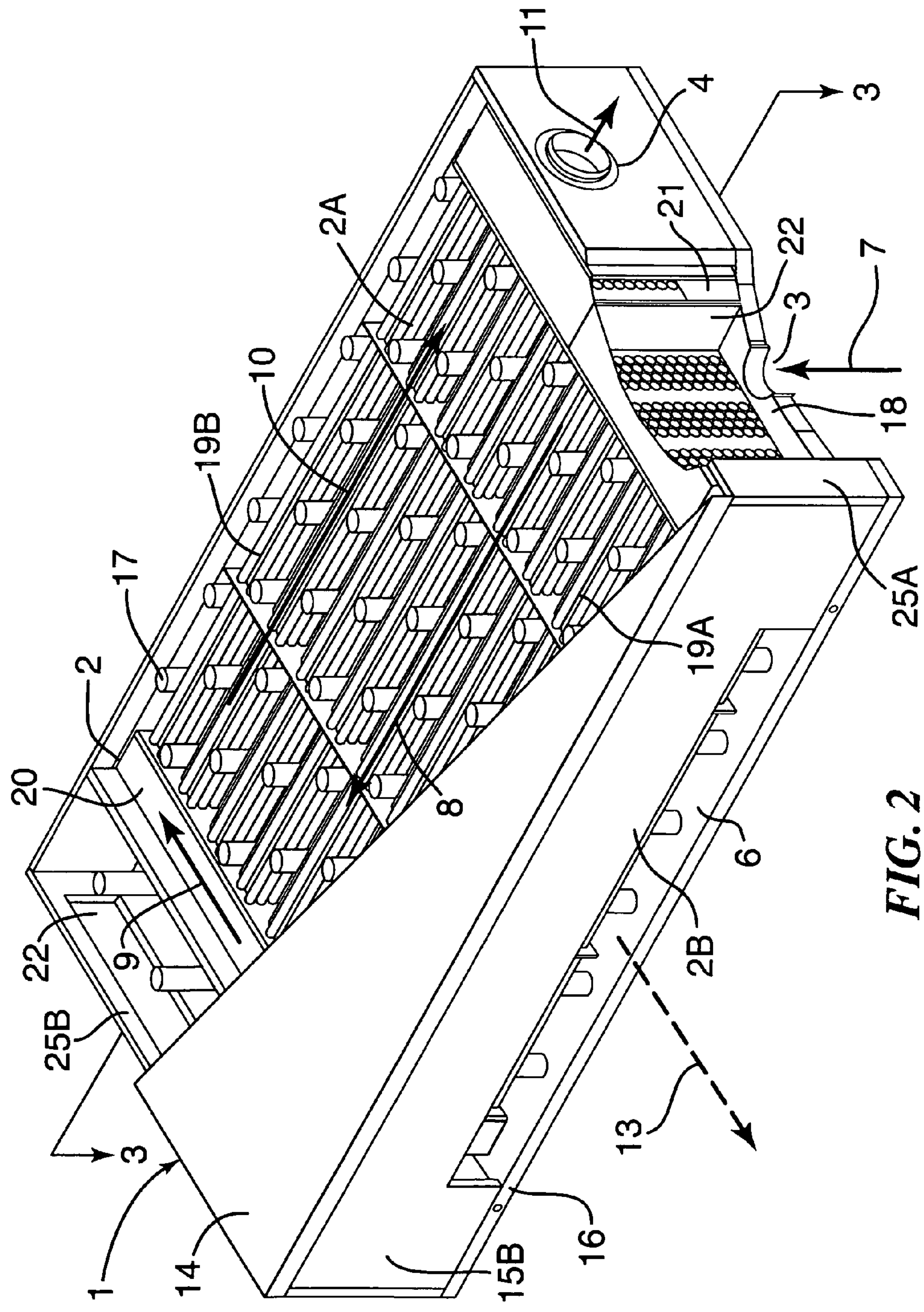
Figure 3:
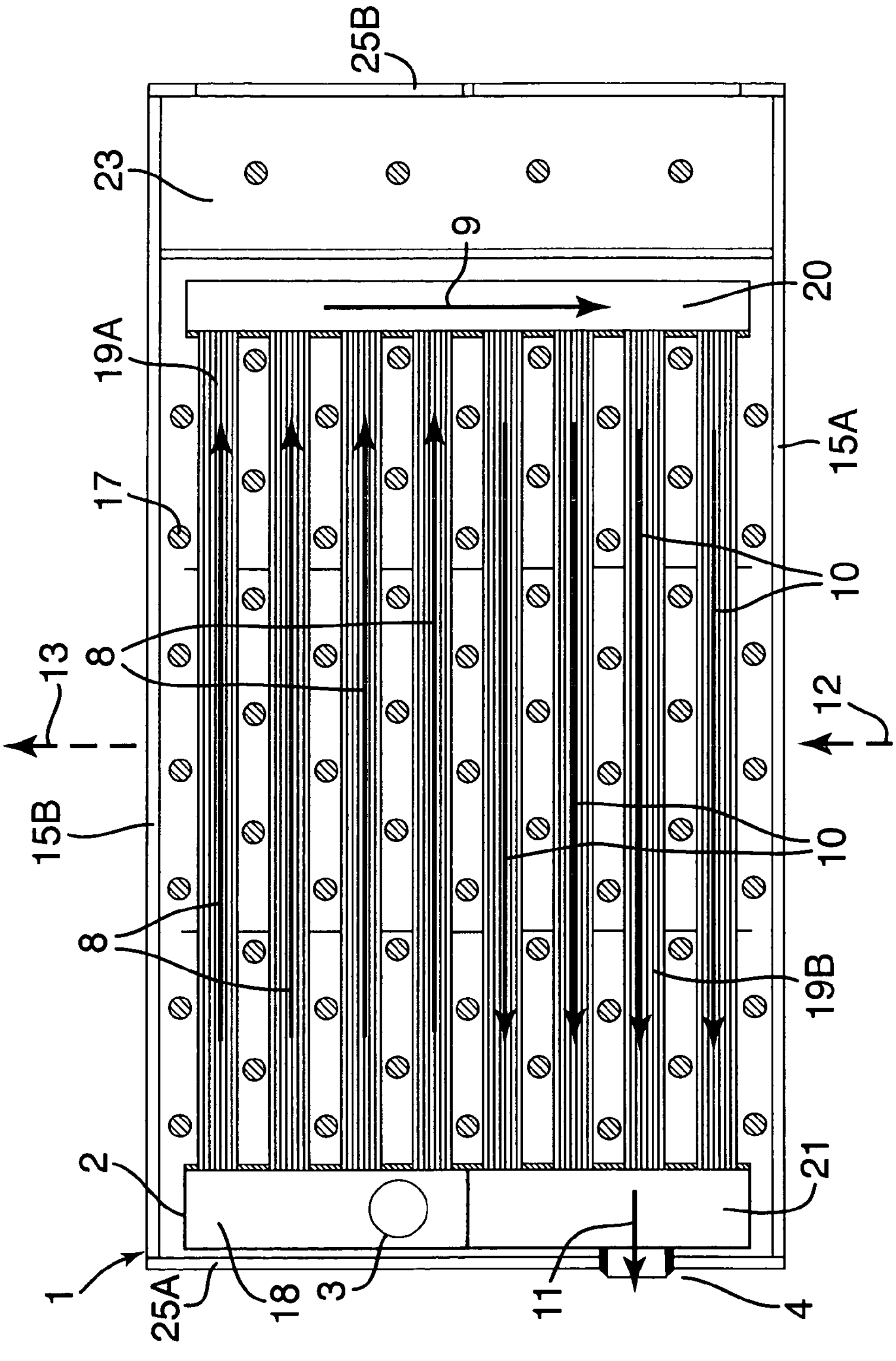
FIG. 3 is a cross-sectional top plan view of the end unit of FIG. 1 taken along the line 3—3 of FIG. 2.

Referring to FIGS. 1, 2 and 3, the illustrative embodiment of the invention has an end unit 1 adapted to be attached to one end of a fuel cell stack. The end unit 1 houses an assembly 2 including first and second units 2A, 2B associated with the flow of a first and second gas, respectively, through the assembly and which act together as a heat exchanger. In the case shown, the first and second gases are fuel cell stack anode or fuel inlet gas and fuel cell stack cathode exhaust gas, respectively.

Particularly, the first unit 2A has an inlet 3 through which fuel gas passes (depicted by arrow 7) into an inlet chamber 18. Fuel gas collects in inlet chamber 18, flows in a direction 8 through a first set of tubes 19A and is delivered to a turn plenum 20. Fuel gas flows in a direction 9 through the turn plenum 20 and from the plenum 20 flows in a direction 10 through the tubes 19B. The gas is delivered by tubes 19B to an outlet chamber 21 (shown in FIGS. 2 and 3). Fuel gas exits the outlet chamber 21 through an outlet pipe 4 in a direction indicated by arrow 11 and, as described in further detail below with respect to FIG. 6, flows through the fuel cell stack.

The second unit 2B forms an enclosure for the first unit 2A. In the illustrative embodiment, the second unit 2B has a first (or top) plate 14, opposing side walls 15A and 15B, front and back walls 25A and 25B, and second (or bottom) plate 16 so as to create a generally hollow box structure of the appropriate length and width to match the fuel cell stack and the appropriate depth so as to remain flat within a desired tolerance upon compressive loading of the stack. As shown in FIGS. 1 and 2, the first unit 2A is contained within the hollow interior of the second unit 2B. In addition, an inlet port 5 (shown in FIG. 1) and an outlet port 6 (shown in FIG. 2) are formed in opposing side walls 15A, 15B of the unit 2B. Also shown in the second unit 2B is a plurality of members 17 extending between the first plate 14 and second plate 16 to provide structural support for the second unit 2B. Members 17 will be described in further detail below with respect to the current collection characteristics of the end unit.

Fuel cell stack cathode gas enters the second unit 2B through inlet port 5 (depicted by arrow 12 in FIG. 1) and flows in a direction substantially transverse to the plurality of tubes 19A, 19B. As described above with respect to the first unit 2A, fuel gas flows along paths 8 and 10 in the first and second sets of the multitude of tubes 19A, 19B. Collectively, the tubes 19A, 19B have the required heat transfer surface area to adequately transfer heat from the hot cathode gas to the fuel gas, thereby raising the temperature of the fuel gas to the desired temperature for delivery to the stack. The cathode outlet gas exits the end plate through opening 6 (as shown by direction 13 in FIG. 2).

The tubes 19A, 19B of the first unit 2A are designed to be mechanically separated from the first (or top) plate 14 forming the end of the stack, second (bottom) plate 16 and side walls 15A, 15B of the second unit 2B. This configuration prevents both excessive stress on the joints of the unit 2A and thermal distortions from affecting the flatness of the top and bottom plates 14, 16 of the second unit 2B.

Also depicted in FIGS. 1, 2 and 3 is a separate chamber 23 in the second unit 2B adapted to collect the anode outlet gas from the fuel cell stack by way of an anode outlet manifold (not shown). Fuel cell stack anode outlet gas is delivered to the chamber 23 through an inlet opening 22 formed in a rear wall 25B of the second unit 2B and exits the chamber 23 through an outlet opening 24 formed in a side wall 15A. With the above configuration for the end unit, all gas connections (ducts, pipes and bellows) for delivering and removing process gases to and from the stack are made through the end unit 1 at one end of the stack.

Figure 4:
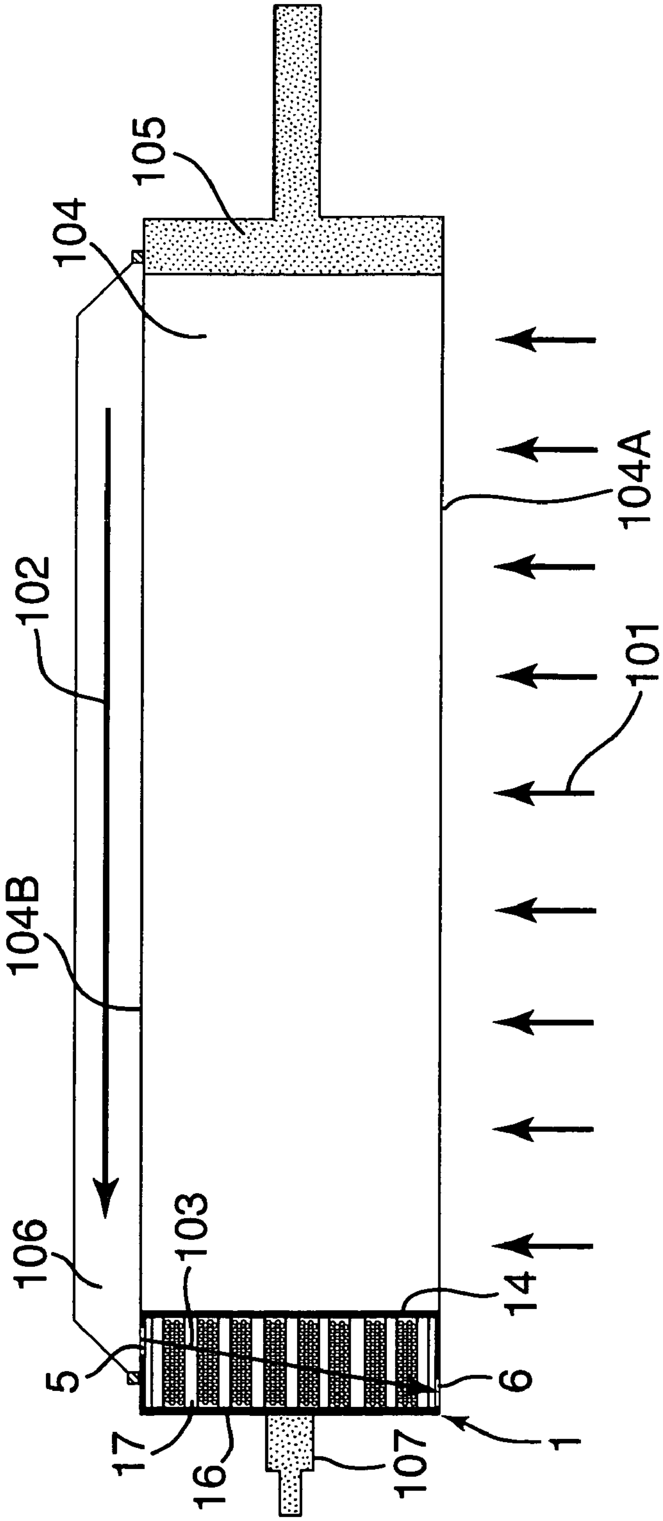
FIG. 4 is a front cross-sectional view of a fuel cell stack utilizing the end unit of FIG. 1.

The path of cathode gas flow through a fuel cell stack employing the end unit 1 of the invention is shown in the fuel cell stack cross-sectional view of FIG. 4. First, cathode inlet gas enters the fuel cell stack 104 along a first face 104A of the stack in a direction depicted by arrows 101. The cathode gas flows through the stack and exits the stack from a second stack face 104B opposite the first (cathode gas inlet) stack face 104A. Attached to the face 104B is a cathode outlet gas manifold 106. Cathode outlet or exhaust gas is collected in the cathode outlet gas manifold 106 and flows through the cathode outlet gas manifold 106 in a direction shown by arrow 102. The cathode outlet gas manifold 106 delivers cathode outlet gas to the end unit 1 through opening 5. Cathode outlet gas then flows through the end unit in a direction represented by arrow 103 and as described above with respect to FIGS. 1–3, and exits the end unit through opening 6. In this configuration, as previously stated, heat is transferred from the fuel cell stack cathode exhaust gas to the anode inlet gas by heat exchange in the end unit 1.

Figure 5:
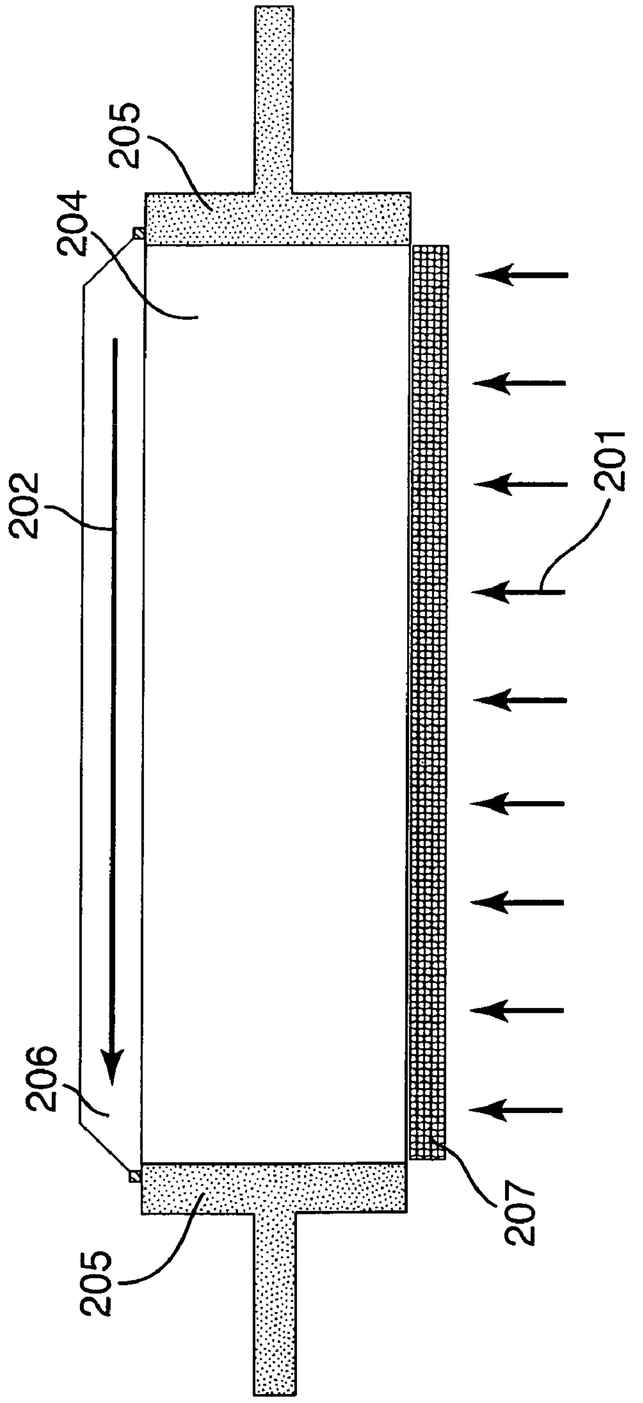
FIG. 5 is a cross-sectional side view of a conventional fuel cell stack.

In a conventional system, as shown in FIG. 5, heat is taken from an inlet stream (depicted by arrows 201) of fuel cell stack cathode gas, requiring an assembly 207 for heat exchange between cathode and anode gases to be disposed along an entire stack face. After flowing through the heat exchanger 207, cathode inlet gas flows through the stack 204 and exits the stack into a cathode outlet gas manifold 206. By providing heat exchange in the end unit attached to the end of a fuel cell stack in accord with the invention, rather than along an entire stack face as in the conventional structure of FIG. 5, large space requirements, non-uniformity in stack inlet temperature distribution and the risk of cell-to-cell wet seal leaks, as discussed above, are obviated.

Figure 6:
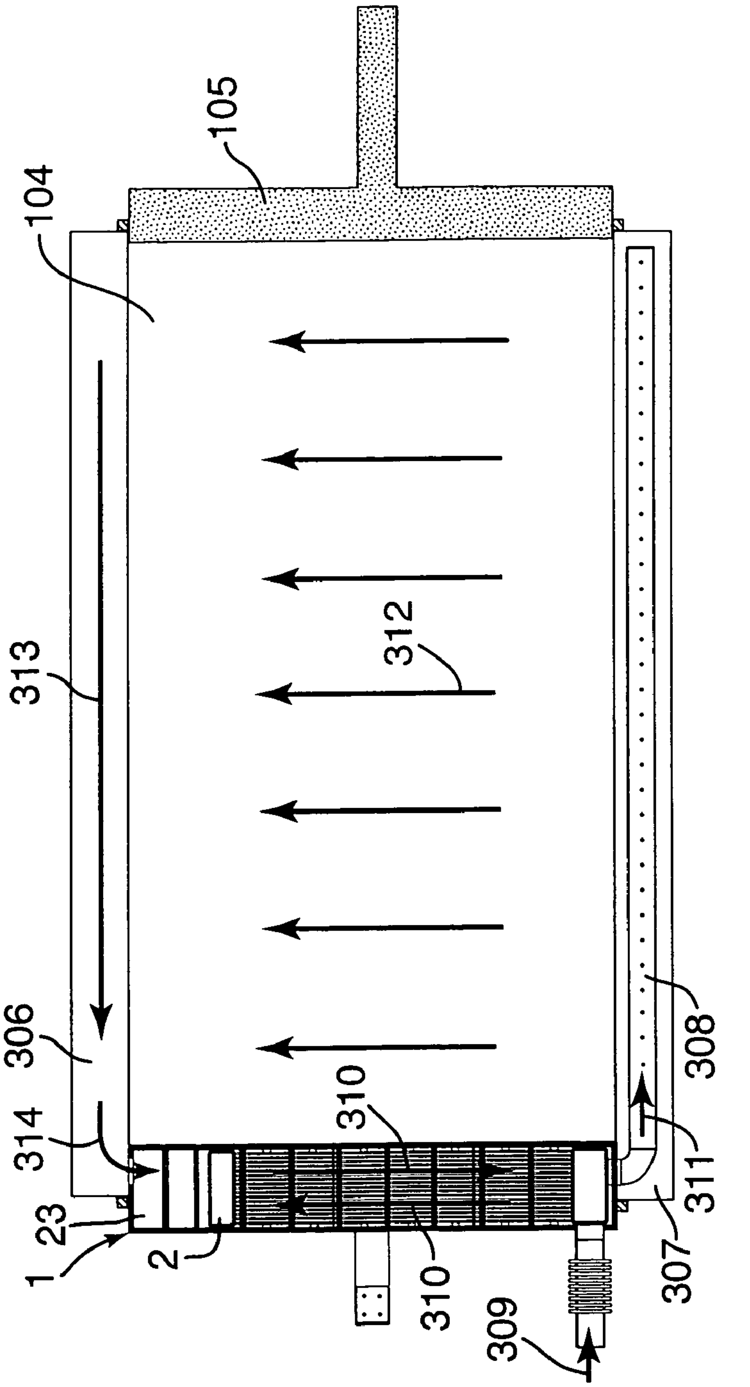
FIG. 6 is a side cross-sectional view of the fuel cell stack of FIG. 4.

FIG. 6 shows the path of anode or fuel gas flow through a fuel cell stack employing the end unit 1 of the invention. Fuel gas enters the end unit 1 at inlet 309, fills the inlet plenum 18 (not shown in FIG. 6) and flows through the tubes 19A, turn plenum 20 (not shown in FIG. 6), and tubes 19B in a substantially U-shaped path as depicted by arrows 310. As described above, anode gas is superheated by the transfer of heat from cathode outlet gas flowing transverse to the tubes 19A, 19B. Next, the heated anode gas exits the tubes 19B and flows from outlet plenum 21 (not shown in FIG. 6) of the end unit 1 into a fuel header 308 in a direction depicted by arrow 311. The fuel header 308 is disposed within a fuel gas inlet manifold 307 and extends along the length of the manifold 307. The fuel gas header 308 and manifold 307 permit the heated fuel gas to exit the header and manifold at points along the length of the manifold and flow into the fuel cell stack in a direction depicted by arrows 312. The flow of fuel gas through the fuel cell stack 104 as shown in FIG. 6 is in a direction 312 perpendicular to the direction of the flow of cathode gas through the fuel cell stack, but the anode and cathode gas flow paths do not intersect. After flowing through the stack 104, the fuel gas enters an anode outlet gas manifold 306 and flows in a direction depicted by arrow 313. The anode outlet gas manifold 306 then delivers the gas to the anode outlet gas chamber 23 of the end unit 1 as it flows in a direction shown by arrow 314. In the anode outlet gas chamber 23 of the end unit 1, the anode outlet stream is collected by the necessary ductwork and piping to be delivered to the balance of the fuel cell power plant.

With the end unit 1 of the invention, any fuel gas leaks that may develop over the life of the unit are immediately swept away from the stack by the cathode outlet gas. This is unlike the case of a heat exchanger placed upstream of the stack, in which a leak must first pass through the stack and cathode outlet manifold before leaving the fuel cell module. The risk of a build-up of the mixture of gases within the fuel cell module is reduced.

Turning back to FIG. 4, current collection posts 105, 107 are disposed at the positive and negative ends of the fuel cell stack. The current collection post 107 at the positive end of the stack is spaced from the first plate 14 by a plurality of members 17 (also shown in FIGS. 1–3). In the case shown, the members 17 are formed from electrically conductive material and are shaped as cylindrical columns. As shown in detail in FIGS. 1–3, the members 17 extend between the first plate 14 and second plate 16 and are disposed at uniformly spaced intervals among the first and second sets of said tubes 19A, 19B and in the anode outlet gas chamber 23. In the illustrative embodiment, the first plate 14 of the end unit 1 is in electrical contact with the stack, and the second plate 16 (see FIG. 1) is in electrical contact with the current collection post 107. The members 17 thus provide an electrical connection between the first and second plates 14, 16 of the end unit and additionally provide structural support to the end unit, distributing mechanical and thermal stresses in the end unit that develop during operation of the stack.

FIG. 5 shows a cross-sectional side view of a conventional fuel cell stack. As shown in FIG. 5, current collection posts 205 at each end of the stack are disposed adjacent to the positive and negative ends of the stack and collect current directly from the stack. In the present invention shown in FIG. 4, the separation of the current collection post 107 from the first plate 14 of the end unit 1 by the plurality of members 17 is advantageous in that the members 17 act to restrict electrical current flow slightly, allowing more uniform current collection from the stack through the uniformly spaced members 17.

In all cases it is understood that the above-described apparatus, method and arrangements are merely illustrative of the many possible specific embodiments that represent applications of the present invention. Numerous and varied other arrangements can be readily devised in accordance with the principles of the present invention without departing from the spirit and the scope of the invention. For example, while shown in FIG. 4 at the positive end of the stack, the end unit may be disposed at either the positive or negative ends of the fuel cell stack. Also, designs using a plate fin, compact heat exchanger, could also be configured.

What is claimed is:

1. A fuel cell stack end unit for a fuel cell stack having a plurality of fuel cells stacked in a first direction, said end unit for stacking in said first direction adjacent an end fuel cell in said fuel cell stack, said end unit comprising:

an assembly having: a first wall being adjacent said end cell when said end unit is stacked in said first direction in said fuel cell stack; a second wall opposing said first wall; a first side wall connecting said first and second walls; a second side wall transverse to said first side wall and connecting said first and second walls; a first inlet port receiving a first gas of said fuel cell stack when said end unit is stacked in said fuel cell stack; and a second inlet port in said second side wall for receiving a second gas of said fuel cell stack when said end unit is stacked in said fuel cell stack; said assembly conveying said first and second gases in heat exchange relationship and outputting said gases after heat is transferred from one gas to another when said end unit is stacked in said fuel stack; a third side wall opposing said first side wall and connecting said first and second walls; a fourth side wall opposing said second side wall and connecting said first and second walls; a first outlet port in at least one of said first and third side walls for outputting said first gas after undergoing heat exchange in said assembly; and a second outlet port in said fourth side wall for outputting said second gas after said second gas undergoes heat exchange in said assembly;

wherein said assembly further includes: an interior wall extending between said first and second walls and said second and fourth side walls, said interior wall being spaced from said third side wall and forming with said first and second walls and said second and fourth side walls a chamber; a third inlet port in said third side wall for receiving in said chamber a third gas of said fuel cell stack when said end unit is stacked in said fuel cell stack; and a third outlet port in said second side wall for outputting said third gas after passage through said chamber.

2. A fuel cell stack end unit for a fuel cell stack having a plurality of fuel cells stacked in a first direction, said end unit for stacking in said first direction adjacent an end fuel cell in said fuel cell stack, said end unit comprising:

an assembly: having a first wall being adjacent said end cell when said end unit is stacked in said first direction in said fuel cell stack, a second wall opposing said first wall; a first side wall connecting said first and second walls; a second side wall transverse to said first side wall and connecting said first and second walls; a first inlet port receiving a first gas of said fuel cell stack when said end unit is stacked in said fuel cell stack; and a second inlet port in said second side wall for receiving a second gas of said fuel cell stack when said end unit is stacked in said fuel cell stack; said assembly conveying said first and second gases in heat exchange relationship and outputting said gases after heat is transferred from one gas to another when said end unit is stacked in said fuel stack; a third side wall opposing said first side wall and connecting said first and second walls; a fourth side wall opposing said second side wall and connecting said first and second walls; a first outlet port in at least one of said first and third side walls for outputting said first gas after undergoing heat exchange in said assembly; and a second outlet port in said fourth side wall for outputting said second gas after said second gas undergoes heat exchange in said assembly;

wherein said assembly further comprises: a first unit for defining an enclosed gas flow path for said first gas; and said first and second walls and said first, second, third and fourth side walls forming an enclosure of a second unit enclosing said first unit and defining a gas flow path for said second gas intersecting said first unit, wherein said first and second units act as a heat exchanger transferring heat from said second gas to said first gas.

3. A fuel cell stack end unit according to claim 2, further comprising a third unit disposed within said enclosure for receiving a third gas of said fuel cell stack when said end unit is stacked in said fuel cell stack.

4. A fuel cell stack end unit according to claim 3, wherein said assembly further includes: an interior wall within said enclosure extending between said first and second walls and said second and fourth side walls, said interior wall being spaced from said third side wall and forming with said first and second walls and said second and fourth side walls said third unit; a third inlet port in said third side wall for receiving in said third unit said third gas of said fuel cell stack when said end unit is stacked in said fuel cell stack; and a third outlet port in said second side wall for outputting said third gas after passage through said third unit.

5. A fuel cell stack end unit according to claim 4, wherein said second gas flows into said second unit through said second inlet port and flows out of said second unit through said second outlet port, and wherein said second gas flows through said second unit in a direction transverse to the direction of flow of said first gas through said first unit.

6. A fuel cell stack end unit according to claim 5, wherein said first gas is fuel cell stack anode inlet gas, said second gas is fuel cell stack cathode outlet gas and said third gas is fuel cell stack anode outlet gas.

7. A fuel cell stack end unit according to claim 6, wherein said fuel cell cathode outlet gas is delivered from said fuel cell stack to said second inlet port by a cathode outlet gas manifold disposed on a side of said fuel cell stack.

8. A fuel cell stack end unit according to claim 5, wherein said first unit includes a plurality of tubes for receiving and carrying said first gas.

9. A fuel cell stack end unit according to claim 8, wherein said first gas is fuel cell stack anode inlet gas and said second gas is fuel cell stack cathode outlet gas.

10. A fuel cell stack end unit according to claim 9, wherein said third gas is fuel cell stack anode outlet gas.

11. A fuel cell stack end unit according to claim 10, wherein said plurality of tubes has a surface area transferring heat from said second gas flowing in said second unit to said first gas flowing in said tubes.

12. A fuel cell stack end unit according to claim 11, wherein all connections for delivering and removing process gases to and from said fuel cell stack are disposed in said end unit.

13. A fuel cell stack end unit according to claim 11, wherein said first unit further comprises an inlet chamber and an outlet chamber, said outlet chamber being connected to said inlet chamber by said plurality of tubes.

14. A fuel cell stack end unit according to claim 13, wherein said first unit further comprises: a turn plenum, said turn plenum being connected by a first set of said plurality of tubes to said inlet chamber and being connected by a second set of said plurality of tubes to said outlet chamber.

15. A fuel cell stack end unit according to claim 14, wherein said fuel cell anode inlet gas flows into said inlet chamber, through said first set of said plurality of tubes, said turn plenum, and said second set of said plurality of tubes to said outlet chamber in a substantially U-shaped path.

16. A fuel cell stack end unit according to claim 14, wherein said outlet chamber of said first unit communicates said fuel cell anode inlet gas via said first outlet port to an anode inlet gas manifold disposed on a side of and providing anode gas to said fuel cell stack.

17. A fuel cell stack end unit according to claim 16, wherein said fuel cell stack anode outlet gas is communicated from said fuel cell stack to said third unit of said stack end unit by means of an anode outlet gas manifold disposed on a side of said fuel cell stack.

18. A fuel cell stack end unit according to claim 15, wherein said second unit has said second inlet port and said second outlet port.

19. A fuel cell stack end unit according to claim 18, wherein fuel cell stack cathode outlet gas enters said second unit through said second inlet port and exits said second unit through said second outlet port, said fuel cell cathode outlet gas flowing through said second unit in a direction substantially transverse to the direction of said first and second sets of said plurality of tubes in said first unit.

20. A fuel cell stack comprising: a plurality of fuel cells stacked in a first direction and a fuel cell stack end unit stacked along said first direction adjacent an end fuel cell at each end of the stack, one of said fuel cell stack end units including an assembly having: a first wall being adjacent said end cell; a second wall opposing said first wall; a first side wall connecting said first and second walls; a second side wall transverse to said first side wall and connecting said first and second walls; a first inlet port receiving a first gas of said fuel cell stack; and a second inlet port in said second side wall for receiving a second gas of said fuel cell stack; said assembly conveying said first and second gases in heat exchange relationship and outputting said gases after heat is transferred from one gas to another; a third side wall opposing said first side wall and connecting said first and second walls; a fourth side wall opposing said second side wall and connecting said first and second walls; a first outlet port in at least one of said first and third side walls for outputting said first gas after said first gas undergoes heat exchange in said assembly; and a second outlet port in said fourth side wall for outputting said second gas after said second gas undergoes heat exchange in said assembly; and wherein said assembly further includes: an interior wall extending between said first and second walls and said second and fourth side walls, said interior wall being spaced from said third side wall and forming with said first and second walls and said second and fourth side walls a chamber; a third inlet port in said third side wall for receiving in said chamber a third gas of said fuel cell stack; and a third outlet port in said second side wall for outputting said third gas after passage through said chamber.

21. A fuel cell stack comprising: a plurality of fuel cells stacked in a first direction and a fuel cell stack end unit stacked along said first direction adjacent an end fuel cell at each end of the stack, one of said fuel cell stack end units including an assembly having: a first wall being adjacent said end cell; a second wall opposing said first wall; a first side wall connecting said first and second walls; a second side wall transverse to said first side wall and connecting said first and second walls; a first inlet port receiving a first gas of said fuel cell stack; and a second inlet port in said second side wall for receiving a second gas of said fuel cell stack; said assembly conveying said first and second gases in heat exchange relationship and outputting said gases after heat is transferred from one gas to another; a third side wall opposing said first side wall and connecting said first and second walls; a fourth side wall opposing said second side wall and connecting said first and second walls; a first outlet port in at least one of said first and third side walls for outputting said first gas after said first gas undergoes heat exchange in said assembly; and a second outlet port in said fourth side wall for outputting said second gas after said second gas undergoes heat exchange in said assembly; and wherein said assembly further comprises: a first unit for defining an enclosed gas flow path for said first gas; and said first and second walls and said first, second, third and fourth side walls forming an enclosure of a second unit enclosing said first unit and defining a gas flow path for said second gas intersecting said first unit, wherein said first and second units act as a heat exchanger transferring heat from said second gas to said first gas.

22. A fuel cell stack according to claim 21, wherein said assembly further comprises a third unit disposed within said enclosure for receiving a third gas of said fuel cell stack.

23. A fuel cell stack according to claim 21, wherein said first gas is fuel cell stack anode inlet gas.

24. A fuel cell stack according to claim 23, wherein said second gas is fuel cell stack cathode outlet gas.

25. A fuel cell stack according to claim 24, wherein said assembly further comprises a third unit disposed within said enclosure for receiving a third gas from said fuel cell stack.

26. A fuel cell stack according to claim 25, wherein said third gas is fuel cell anode outlet gas and said assembly further includes: an interior wall within said enclosure extending between said first and second walls and said second and fourth side walls, said interior wall being spaced from said third side wall and forming with said first and second walls and said second and fourth side walls a third unit; a third inlet port in said third side wall for receiving in said third unit said third gas; and a third outlet port in said second side wall for outputting said third gas after passage through said third unit.

27. A fuel cell stack according to claim 26, wherein all connections for delivering and removing process gases to and from said fuel cell stack are disposed in said assembly.

28. A fuel cell stack according to claim 26, wherein said first unit comprises: a plurality of tubes for receiving and carrying said first gas; an inlet chamber and an outlet chamber, said outlet chamber being connected to said inlet chamber by said plurality of tubes.

29. A fuel cell stack according to claim 28, wherein said first unit further comprises: a turn plenum, said turn plenum being connected by a first set of said plurality of tubes to said inlet chamber and being connected by a second set of said plurality of tubes to said outlet chamber.

30. A fuel cell stack according to claim 29, wherein said fuel cell anode inlet gas flows from said inlet chamber through said first set of said plurality of tubes, said turn plenum, and said second set of said plurality of tubes, to said outlet chamber in a U-shaped path.

31. A fuel cell stack according to claim 29, further comprising: an anode gas inlet manifold disposed on one side of said stack, said anode gas inlet manifold receiving said fuel cell anode inlet gas from said outlet chamber of said first unit via said first outlet port and communicating said fuel cell anode inlet gas to said fuel cell stack.

32. A fuel cell stack according to claim 31, further comprising: an anode gas outlet manifold disposed on a side of said stack opposite said anode gas inlet manifold, said anode gas outlet manifold communicating said fuel cell anode outlet gas from said fuel cell stack to said third unit via said third inlet port.

33. A fuel cell stack according to claim 32, wherein said second unit has said second inlet port and said second outlet port.

34. A fuel cell stack according to claim 33, wherein said fuel cell cathode outlet gas: enters said second unit through said second inlet port;

flows through said second unit in a direction substantially transverse to the direction of said first and second sets of said plurality of tubes; and exits said second unit through said second outlet port.

35. A fuel cell stack according to claim 34, further comprising a fuel cell cathode outlet gas manifold disposed on one side of said stack, said cathode gas outlet manifold delivering said fuel cell cathode outlet gas from said fuel cell stack to said second inlet port of said second unit.

* * * * *